Patented Dec. 21, 1948

2,456,933

UNITED STATES PATENT OFFICE 2,456,933

BRAZING ALLOY

Wasil W. Dyrkacz, Schenectady, N. Y., assignor to General Electric Company, a corporation of New York No Drawing. Application November 25, 1943, Serial No. 511,710

1 Claim. (Cl. 75—173)

The present invention is a brazing alloy which is particularly adapted for brazing high nickel alloys, for example alloys of the type commonly designated by the name "fernico," which contain about 16% cobalt, 30% nickel, with the remainder iron. Hitherto it has been difficult to provide a satisfactory vacuum tight seal between copper and fernico alloys due apparently to the fact that the available silver brazing alloys penetrate the nickel alloy intergranularly and produce minute cracks which result in leaks.

It is one of the objects of the present invention to provide a brazing alloy which has a melting point in the neighborhood of 750 to 900° C., which flows easily and wets high nickel alloys but does not cause intergranular penetration of such alloys which may result in leaks.

In carrying out the present invention, I employ a brazing alloy which consists of about 30 to 90% silver, 0.1 to 4% phosphorus with the remainder copper and which preferably consists of about 86% silver, 13% copper and 1% phosphorus. If copper is brazed to fernico with a commercial brazing alloy consisting of 30% silver, 38% copper and 32% zinc, it will be found that there is a deep intergranular penetration of the fernico by the brazing alloy. Similar penetration, but to a lesser degree, occurs if the commercial brazing alloy consisting of 72% silver and 28% copper is used. However, when copper and other metallic materials, for example steel, are brazed to fernico or other high nickel alloys with my improved brazing alloy consisting of silver, copper and phosphorus, there is no appreciable intergranular penetration by the brazing alloy. The fact that my improved brazing alloy does not penetrate fernico intergranularly is believed due to the tendency of the brazing alloy to form a thin compound approximately 0.3 mil thick at the junction with the fernico. This compound in turn appears to inhibit the diffusion of the solder or brazing alloy into the fernico.

My improved brazing alloy may be cold rolled easily into fine strip or drawn into wire, and is suitable for use in ordinary line hydrogen without the use of a flux, or in air with a flux.

What I claim as new and desire to secure by Letters Patent of the United States, is:

A brazing alloy for use in brazing copper to fernico alloys, said brazing alloy consisting of 86% silver, 13% copper and 1% phosphorus.

WASIL W. DYRKACZ.

REFERENCES CITED

The following references are of record in the file of this patent:

UNITED STATES PATENTS

| Number | Name | Date |
|---|---|---|
| 1,658,713 | Fuller | Feb. 7, 1928 |
| 1,829,903 | Leach | Nov. 3, 1931 |
| 1,899,701 | Leach | Feb. 28, 1933 |
| 2,019,984 | Leach | Nov. 5, 1935 |
| 2,156,298 | Leitner | May 2, 1939 |
| 2,156,306 | Rapatz | May 2, 1939 |
| 2,196,302 | Hensel et al. | Apr. 9, 1940 |
| 2,310,231 | Goldsmith | Feb. 9, 1943 |